United States Patent [19]
Hollis et al.

[11] Patent Number: 5,863,060
[45] Date of Patent: Jan. 26, 1999

[54] FIFTH WHEEL KING PIN RELEASE MECHANISM

[75] Inventors: William E. Hollis; William E. Hollis, Jr., both of Pittsburgh, Pa.

[73] Assignee: Westinghouse Air Brake Co., Wilmerding, Pa.

[21] Appl. No.: 763,310

[22] Filed: Dec. 10, 1996

[51] Int. Cl.[6] ................................................ B62D 53/08
[52] U.S. Cl. .............................. 280/433; 74/544; 16/115
[58] Field of Search ............................. 280/433; 74/543, 74/544; 16/114 R, 115

[56] References Cited

U.S. PATENT DOCUMENTS

| | | | |
|---|---|---|---|
| 2,581,254 | 1/1952 | Greenawalt | 74/544 |
| 3,239,241 | 3/1966 | Worden | 280/434 |
| 4,251,089 | 2/1981 | Skaggs | 280/433 |
| 5,040,432 | 8/1991 | Carlstedt | 74/544 |
| 5,226,198 | 7/1993 | Martin | 16/114 R X |
| 5,378,007 | 1/1995 | Joyce | 280/433 |
| 5,423,567 | 6/1995 | Upton | 280/433 |

*Primary Examiner*—Robert J. Oberleitner
*Assistant Examiner*—Tyrone M. Lee
*Attorney, Agent, or Firm*—James Ray & Associates

[57] ABSTRACT

A manual release apparatus for disengaging a king pin on a truck trailer from a fifth wheel of a truck cab, including an elongated lever arm, a first end of which is pivotally attached to a side of the fifth wheel at a location spaced from the opening through which the release rod extends, a second end of which is spaced away from the fifth wheel extending horizontally from the first end, whereby the lever arm is attached to the release rod, such that a manual movement of the second end of the lever arm will cause the lever arm to be pivoted horizontally about the first end, thereby causing the release rod to be pulled outwardly to disengage the king pin from the fifth wheel. The elongated lever arm is provided with an adjustable extension arm so that the length of the lever arm can be adjusted to an extent desired to best facilitate manipulation thereof.

18 Claims, 3 Drawing Sheets

FIFTH WHEEL KING PIN RELEASE MECHANISM

CROSS-REFERENCE TO RELATED APPLICATIONS

This application is related to co-pending patent application Ser. No. 08/589,421, titled "Fifth Wheel King Pin Release Mechanism", filed Jan. 22, 1996 by the same applicants.

FIELD OF THE INVENTION

This invention relates generally to articulated semi-trailer trucks and the interconnection between the cab and trailer. More particularly, this invention relates to a unique and improved lever apparatus intended to be permanently mounted to the fifth wheel of a truck cab for quickly, easily and more safely disconnecting the king pin on the truck trailer from the fifth wheel on the truck cab; and even more specifically relates to an improvement over the apparatus disclosed in the above-identified co-pending application in being particularly advantageous on truck cabs having tandem drive axles, and includes means to better and more permanently secure the apparatus to the fifth wheel.

BACKGROUND OF THE INVENTION

Semi-trailer trucks are well known throughout the world in which an independent truck trailer can interchangeably be connected to practically any desired truck cab for transporting the trailer and it contents to any desired location. While the truck cab and truck trailer can take any one of a large variety of different forms and sizes, depending on the intended use and intended load to be transported, the interconnection between the cab and trailer has developed into a uniform standard design so that the cabs and trailer can readily be interchanged according to need. Pursuant to this standard form, the truck cab is normally provided with a chassis structure such that a portion of the truck frame extends rearwardly of the cab with one or more drive axles, upon which wheel and tires are mounted, supporting the truck cab on the road surface under the rearwardly extending portion of frame structure. A tiltable, steel disk, commonly referred to as the "fifth wheel", is horizontally disposed on the upper side of the rearwardly extending frame portion, with the fifth wheel having a diverging "V" slot extending rearwardly from an aperture at the axial center.

The truck trailer, on the other hand, is normally provided with one or more rear axles, to which wheels and tires are mounted, for supporting the rear-end of the trailer on the road surface. When interconnected, the front end of the tuck trailer is supported on the fifth wheel mounted on the rearwardly extending portion of the cab frame such that the rear cab axle or axles support the load in the front-end portion of the trailer. A king pin extending downwardly from the under surface of the trailer near the front thereof is adapted to be engaged within the aperture on the fifth wheel, so that the trailer can be pivotally connected to the cab and pulled thereby in an articulated manner. For friction reducing purposes, the upper surface of the fifth wheel is normally greased heavily, as in its articulating action, the forward portion of trailer undersurface must be free to pivotally rotate against the upper surface of the fifth wheel. To support the truck trailer in the absence of a cab, the front end of the trailer is normally provided with a crank-down support means disposed rearwardly of the king pin, which can be manually operated to lower the support means to a vertical orientation, to thereby support the forward end of the trailer.

To connect the truck cab to the truck trailer, the front end of the trailer must be supported on the crank-down support means, or other such support, such that the king pin extends downwardly from the front of the trailer floor spaced above the road surface by a distance sufficient to permit the fifth wheel on the cab to be backed under the king pin. The diverging "V" slot in the fifth wheel is designed so that upon driving the truck cab in reverse, the driver can guide the "V" slot around the king pin extending downwardly from the front end of the trailer, and guide it to the aperture at the axial center, where a spring loaded locking mechanism secured to the lower side of the fifth wheel will lock the king pin in place within the aperture, thereby also holding the forward undersurface of the trailer against the upper surface of the fifth wheel. When so locked together, the truck cab and truck trailer can readily function as an articulated semi-trailer truck. The locking mechanism on the undersurface of the fifth wheel is well known in the art and need not be described here.

To disconnect the truck trailer from the track cab, an elongated release rod is horizontally disposed at the under surface of the fifth wheel which emerges through an opening in the side wall of the fifth wheel. One end of the release rod is connected to the above-mentioned spring-loaded locking mechanism, with its other end extending through the side wall opening on the fifth wheel, and having an eyelet at its outer end, to which a release tool can be attached. The release rod is normally transverse to the center-line of the truck cab, so that the side wall opening and eyelet are normally located on the left side of the cab between the upper surface of the cab's left-rear tire or tires and the under surface of the trailer resting on the fifth wheel.

To physically and manually release and disengage the truck trailer from the fifth wheel, a release tool, which comprises an elongated steel rod having a hook at one end and a hand-grip at the other, is hooked into the eyelet at the outer end of the release rod, and the tool manually pulled so that the release rod will pull on the locking mechanism to disengage the trailer king pin. When so disengaged, the truck cab can be driven in a forward direction from under the trailer. Obviously, the crank-down support means under the trailer must first be positioned so that the front end of the trailer will be supported on the road surface when the cab is driven away therefrom, and in ready position to permit the same or another truck cab to later be attached thereto.

While such a disengaging effort is not particularly difficult, it is not as simple and easy as could be hoped for. For example, to engage the release tool into the release rod eyelet, the truck operator must normally stoop over so that he can see the eyelet which is normally positioned under the bottom surface of the trailer and over the cab's rear tire or tires, and then reach therebetween to engage the hook into the eyelet. This can be unpleasant and complicated in the darkness of night, or during fowl weather situations where snow and/or ice may be packed in and around the fifth wheel or between the cab rear tires and the trailer. In addition, it is not uncommon for the release tool hook to slip from the release rod eyelet when not properly engaged, causing the driver to injure his back, hit his head on the trailer, or hit his knuckles or arm against the trailer or tires. In addition further, it is not uncommon for the release tool to be lost, stolen or misplaced, making it impossible to release the trailer until a release tool is located. Because of the grease that must be utilized between trailer and fifth wheel interfaces, the area in and around the fifth wheel is often rather greasy and mixed with road dirt, so that in addition to mud that may be on the cab tire surfaces, the above described release effort can also be a rather messy task.

In addition to the above problems, it should be noted that many of the prior art release rods are provided with a stop bar welded to the underside which functions as a lock to prevent unintentional pulling of the release rod. Specifically, the stop bar is of shorter length than the release rod so that the outer blunt end thereof will abut against the edge of the hole through which the release rod extends to thereby prevent the release rod from being pullable outward unless it is also lifted upwardly to an extent sufficient to permit the stop bar to also fit through the hole. That is to say, the hole is normally elongated in the vertical direction so that when lifted, both the release rod and stop bar will easily fit therethrough. In a like manner, the opposite blunt end of the stop bar will abut against the outer hole edge to thereby prevent the spring loaded locking mechanism from pulling the release rod inward, which in essence locks the release mechanism in the king pin "release" position. It should be apparent, that it is rather difficult to effect the required lifting action together with the pulling action when using the conventional release tool merely hooked to the eyelet of the release rod, particularly in view of the rather restricted space that may exist between the truck cab rear tires and the bottom of the trailer.

Our co-pending patent application, Ser. No. 08/584,421, filed Jan. 22, 1996, teaches a new and improved apparatus intended to be permanently mounted to the fifth wheel of a truck cab for quickly, easily and more safely disconnecting a trailer king pin from the fifth wheel of the truck cab. Accordingly, the apparatus of that invention eliminates the need for a separate tool; i.e., a release tool, thereby avoiding the complications and lost time that can result from a lost, stolen or misplaced release tool, and further eliminates the sometimes complicated or unpleasant task of hooking the release tool to the eyelet on the release rod, as noted above. In addition, that apparatus, in using a lever arm to pull the release rod outwardly, can very easily be utilized to effect the necessary lifting action to disengage the stop bar as described above, making the entire release activity an effortless task. More importantly, that inventive apparatus further eliminates the possibility of injury that can result to the operator when the release tool hook slips from the release rod eyelet during the disengaging effort.

In essence, the apparatus of that invention comprises an elongated, rigid lever arm, a first end of which is pivotally attachable to a side of the fifth wheel at a location spaced from the opening through which the release rod emerges, and a second end adapted to be spaced away from the fifth wheel extending generally horizontally from the first end, and including means thereon for attaching the lever arm to the elongated release rod, such that a manual motion applied to the lever arm at the second end, can cause the lever arm to be pivoted generally horizontally at the first end, thereby causing a levered pulling action on the release rod so that the release rod is pulled outwardly sufficient to disengage the king pin from the fifth wheel.

While the inventive apparatus described above has been shown to provide very significant advantages over the prior art, some shortcomings have been noted. Specifically, it has been found that the desired length of the lever arm varies depending upon the size of the truck cab and the number of drive axles at the rear of thereof. With a single drive axle, lever arm lengths of about 4 to 5 feet are quite adequate. On the other hand, such lever arms on truck cabs having tandem drive axles or tri-axles tend to be unnecessarily short so that the user must still reach under the trailer, not only to grasp the lever arm, but even when fully pulled outward it may still not sufficiently clear the trailer and cab rear axles to avoid all difficulties.

In addition to the above, it has also been noted that the moment of inertia resulting from the weight of the lever arm extending from the single bolt holding the apparatus against the side of the fifth wheel, tends to cause the apparatus to sag and twist at the bolt, thereby loosening the bolt and intensifying the sagging movement so that the entire apparatus can quickly become excessively loosened.

As a third problem, it had been observed that the elongated release rod as attached to the original lever arm was attached at a fixed single point so that the pivotal movement of the lever arm caused an arcuate displacement of that fixed single point. As a result, the arcuate displacement of the lever arm pulling the release rod out from the fifth wheel has tended to bend the release rod somewhat which may interfere with its being drawn back inward by the spring loaded lock mechanism.

SUMMARY OF THE INVENTION

This invention is predicated upon our conception and development of an improved version of the apparatus disclosed in the above-mentioned co-pending patent application, namely an improved version of the lever apparatus having a lever arm of adjustable length which renders it ideally suited for use on truck cabs regardless of the number of drive axles or other variations which would dictate a preference for a longer lever arm. Accordingly, the operator can adjust the length of the lever arm to be appropriate for what is needed to permit him to operate the apparatus without difficulty. In addition to the above, the lever apparatus of this invention includes a support flange on the pivot link holding the lever arm against the fifth wheel, which significantly lessens the lever arm's tendency to twist, sag and become loosened as a result of the moment of inertia resulting from the weight of the lever arm extending from the single bolt holding the apparatus against the side of the fifth wheel. As a third improvement, the problem of bending the release rod has been overcome by attaching the release rod to a slide coupling parallel to the lever arm so that the point of attachment moves when the lever arm is pivoted, thereby permitting the release rod to be pulled straight outward from the fifth wheel without any tendency to bend the release rod.

OBJECTS OF THE INVENTION

Accordingly, it is a primary object of this invention to provide a new and improved lever apparatus for quickly, easily and more safely disengaging the king pin of a truck trailer from the truck cab's fifth wheel.

Another primary object of this invention to provide a new and improved apparatus for quickly, easily and more safely disengaging the king pin of a truck trailer from the truck cab's fifth wheel which is permanently attached to the fifth wheel and thereby eliminates the need to repeatedly engage a release tool onto the release rod eyelet each time a release is desired, and which cannot, therefore, be lost, stolen or misplaced.

A further primary object of this invention to provide a new and improved apparatus for quickly, easily and more safely disengaging the king pin of a truck trailer from the truck cab's fifth wheel which is permanently attached to the cab's fifth wheel and release rod which eliminates the possibility of injury that can result when the release tool hook slips from the release rod eyelet.

Still another primary object of this invention is to provide a new and improved apparatus for quickly, easily and more safely disengaging the king pin of a truck trailer from the truck cab's fifth wheel which includes a lever arm of adjustable length rendering the apparatus better suited for use on truck cabs regardless of the number of drive axles and other variables which could dictate a longer lever arm.

An even further primary object of this invention is to provide a new and improved apparatus for quickly, easily and more safely disengaging the king pin of a truck trailer from the truck cab's fifth wheel which includes support means which will lessen the tendency of the apparatus to twist and sag as a result of the moment of inertia resulting from its weight extending from the single bolt holding the apparatus against the side of the fifth wheel.

Still a further object of this invention is to provide a new and improved apparatus for quickly, easily and more safely disengaging the king pin of a truck trailer from the truck cab's fifth wheel which will not cause the release rod to bend when it is pulled outwardly from the fifth wheel.

These and other objects and advantages of this invention will become apparent after a full reading of the following detailed description, particularly when read in conjunction with the attached drawings as described below.

DESCRIPTION OF THE PREFERRED EMBODIMENT OF THE INVENTION

Figure 4:
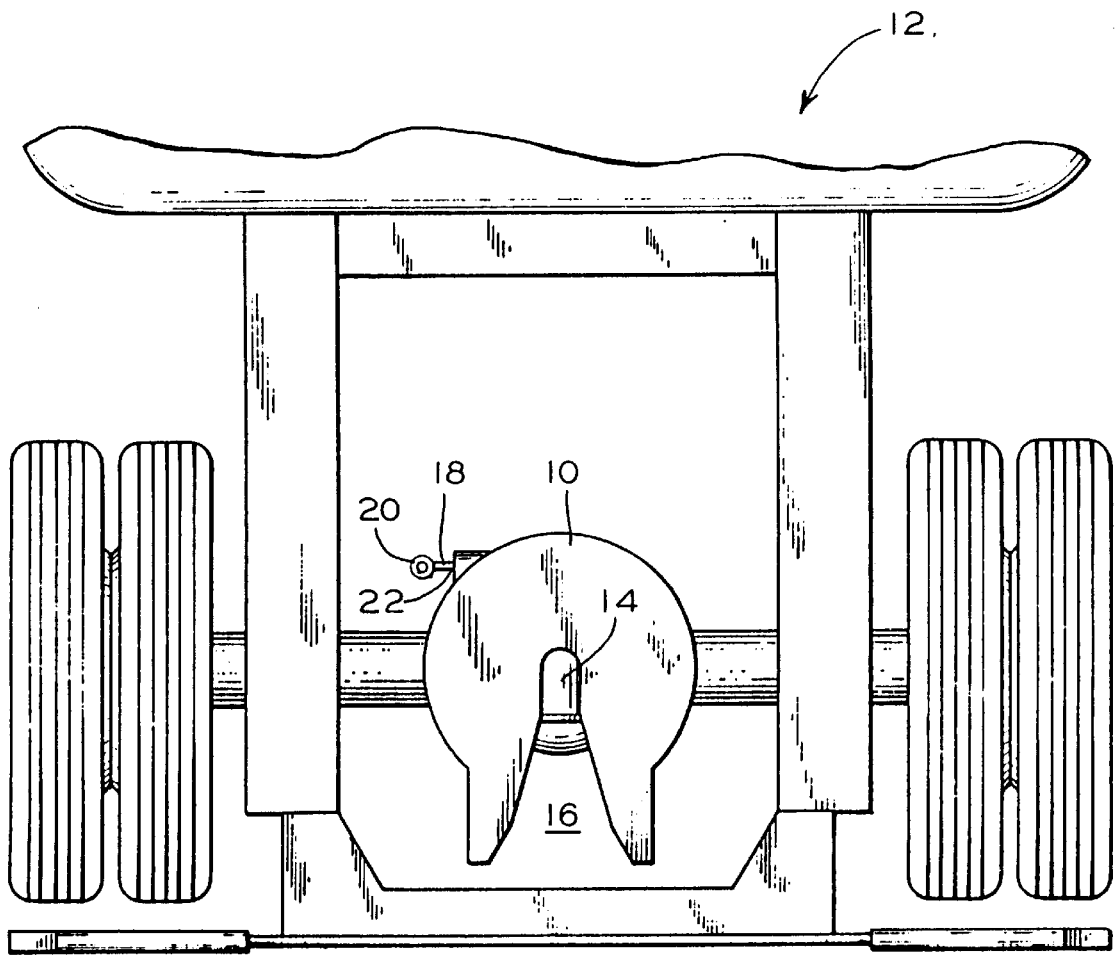
FIG. 4 is a partial plan view of the rear portion of a prior art truck cab showing the fifth wheel mounted thereon.

Reference to FIG. 4 will illustrate the fifth wheel on the rear of a truck cab pursuant to the existing prior art. As can be seen, the fifth wheel 10, mounted over the rear tires of truck cab 12, is provided with an aperture 14 at the axial center with a diverging "V" slot 16 extending rearwardly from aperture 14. A release rod 18, having an eyelet 20 at its outer end, extends through an aperture 22 in the left-hand side of the cylindrical side wall of the fifth wheel 10. Pursuant to prior art practice, a release tool (not shown), which merely comprises an elongated steel rod, about three feet in length having a hook at one end and a hand grip at the other, is utilized to disengage a trailer's king pin from the fifth wheel, which involves the effort of engaging the hook on the release tool (not shown) into the eyelet 20, and pulling on the release tool so that the release rod 18 is pulled outwardly from the fifth wheel 10, which will effect a disengagement of the king pin from the fifth wheel locking mechanism (not shown). As noted above, the effort of engaging the hook into eyelet 20, can be difficult under certain circumstances, and the hook can become disengaged at times during the pulling action which can result in injury to the operator.

As described in co-pending patent application Ser. No. 08/589,421, cited above, the apparatus of that invention can be utilized without altering the fifth wheel 10 from the prior art fifth wheel 10 as shown in FIG. 4.

Figure 1:
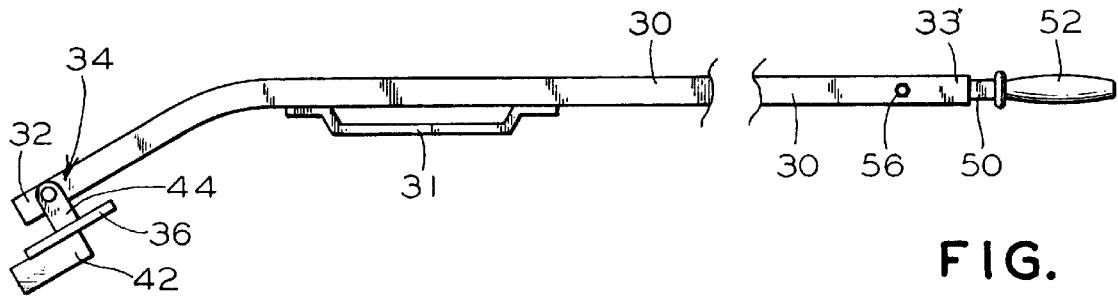
FIG. 1 is a plan view of a presently preferred embodiment of the lever apparatus of this invention for disconnecting a trailer king pin from the fifth wheel of a truck cab, showing the lever arm to have a telescoping extension arm.
Figure 2:
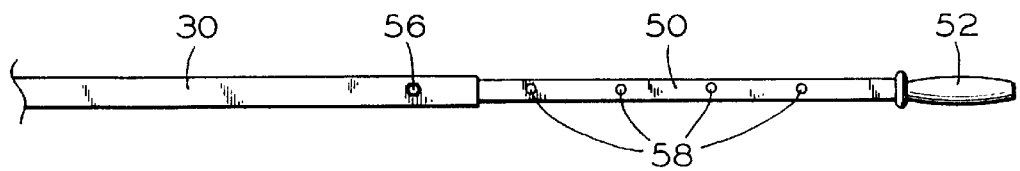
FIG. 2 is partial plan view of the apparatus shown in FIG. 1, but showing the extension arm fully extended.
Figure 3:
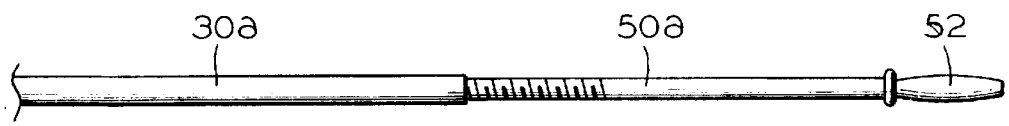
FIG. 3 is another partial plan view substantially the same as FIG. 2 except that it illustrates another embodiment of this invention with the extension arm being screw threaded to the end of the lever arm.
Figure 6:
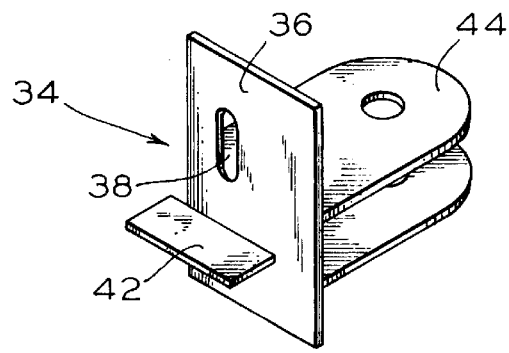
FIG. 6 is an isometric view of the pivot link shown in FIG. 1, further illustrating the flange which minimizes and prevents sagging and twisting of the lever arm as will loosen the apparatus from the fifth wheel.

Reference to FIGS. 1–3 will illustrate a presently preferred embodiment of the improved apparatus of this invention wherein the lever arm 30 comprises a rigid, elongated lever, such as a length of tubular steel, having a first end 32 pivotally attachable to a side of fifth wheel 10 at a location spaced from the opening 22 through which the release rod 18 extends. As specifically shown, a pivot link 34 is boltable to the side of fifth wheel 10, which is provided with a vertical flange 36 having an aperture 38 (FIG. 6) therethrough through which a bolt can be inserted to fasten pivot link 34 to the side of fifth wheel 10. A horizontal flange 42 extends outwardly from vertical flange 36 which is positioned to abut against the undersurface of fifth wheel 10. It should be noted that all prior art fifth wheels are already provided with a threaded bolt hole (not shown) in the side thereof which is about two feet counter-clockwise from the hole 22 through which release rod 18 emerges, at which pivot link 34 can easily be attached. While the purpose for bolt hole (not shown) is not known, it is assumed that such bolt holes are utilized in the manufacture of the fifth wheel 10, or perhaps in the assembly and installation of the fifth wheel onto the truck cab chassis 12. In any event, such a bolt hole is always present and is not utilized in the normal operation and use of the articulated semi-trailer truck, so that fastening the pivot link 34 thereto will not interfere with normal operation of the truck cab and truck trailer. In addition to vertical flange 36 and horizontal flange 42, pivot link 34 is also provided with at least one horizontal flange 44 to which the first end 32 of lever arm 30 is pivotally bolted. Preferably, a pair of parallel horizontal flanges 44 are provided with the lever arm 30 pivotally bolted therebetween.

One of the unique features of this invention, as contrasted to that disclosed in the above-referenced co-pending application Ser. No. 08/589,421, is the horizontal flange 42 which is positioned to abut against the undersurface of fifth wheel 10. Accordingly, with bolt 40 holding pivot link 34 tightly against the side of fifth wheel 10 as well as holding horizontal flange 42 tightly against the undersurface of fifth wheel 10, the fixing of horizontal flange 42 against the undersurface of fifth wheel 10 will prevent the weight of the apparatus from causing the pivot link 34 to twist at bolt 40 to loosen the attachment.

Figure 5:
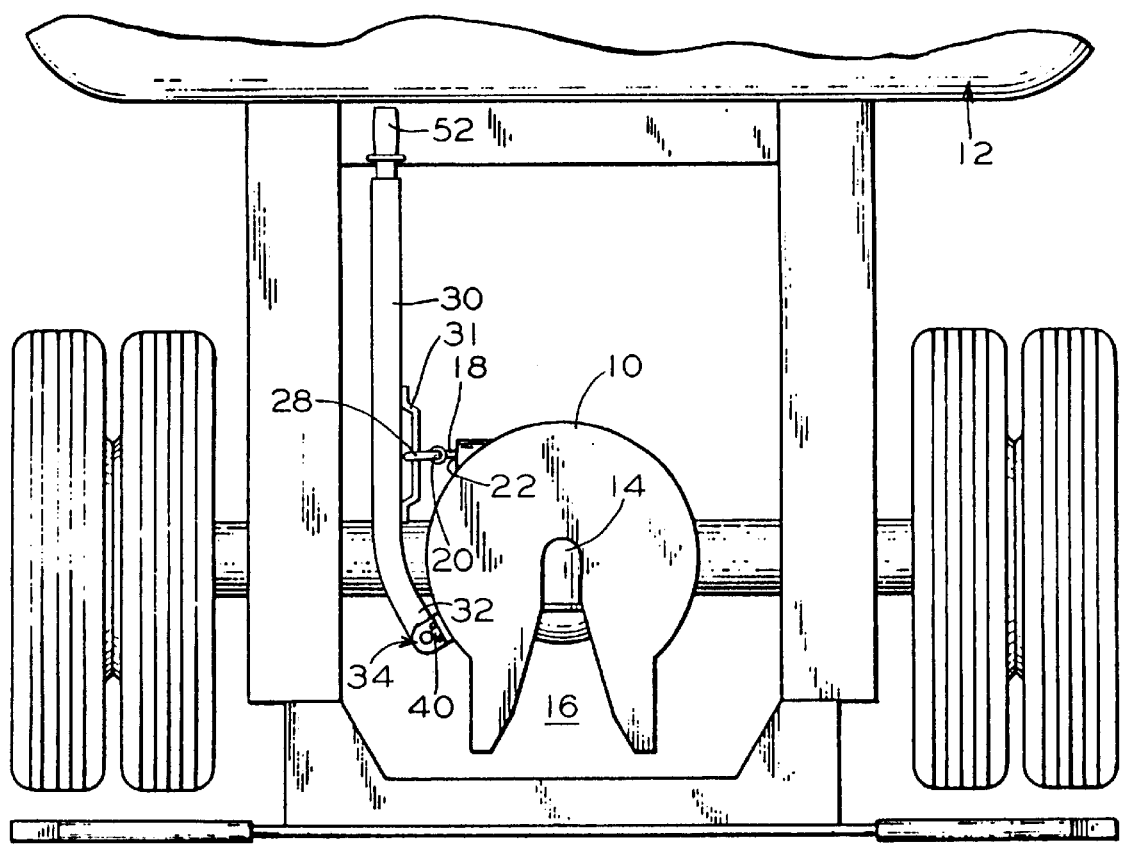
FIG. 5 is a partial plan view showing the lever apparatus of this invention as preferably installed onto the fifth wheel of a truck cab having tandem drive axles as illustrated in FIG. 4.

The lever arm 30 should be configured such that a portion thereof will extend adjacent to release rod 18, with the second end 33 of lever arm 30 spaced away from the fifth wheel 10 extending generally horizontally from said first end 32. Means, such as a connecting loop 28 at the end of release rod 18, is provided for the purpose of attaching release rod 18 to lever arm 30, at slide bar 31. Since release rod 18 is not attached at a single point along the length of lever arm 30, but is rather allowed to slide with respect to slide bar 31, there is no tendency for release rod 18 to be bent as it is withdrawn from fifth wheel 10. Preferably, that portion of lever arm 30 positioned between pivot link 34 and release rod 18 is sufficiently curved or bent so that it can generally fit rather closely to the cylindrical side surface of fifth wheel 10, as shown in FIG. 5. That portion of lever arm 30 extending from release rod 18 to the second end 33 can have any desired configuration, but preferably should be such that the second end 33 is not only spaced away from the fifth wheel 10 extending generally horizontally from the first end 32, but is such that the second end 33 is at a position where it can be easily seen and grasped. Obviously, second end 33 should not be at a location where it extends beyond the side dimension of the truck trailer (not shown) where it could be side-swiped in tight traffic, or cause injury to anyone passing by the truck or standing adjacent to the moving truck. Pursuant to the embodiment shown, the second end 33 is therefore, preferably positioned somewhat forward of the normally rounded forward wall of the trailer (not shown) so that it can be easily seen, grasped and manipulated without being in a position where it becomes a hazard to bystanders.

The crux of this invention resides in extension arm 50 which is adapted to lengthen lever arm 30, which of course, provides added leverage, but more importantly provides more room for the operator to manipulate the lever arm 30 without being confined within the narrow area between the bottom of the trailer and the rear tires on the truck cab, and most importantly without the hazards posed by an elongated lever arm 30 as noted above. In the embodiment shown, the extension arm 50 is a length of tubular steel having a square cross-section, which is telescopically insertable into the outer end of lever arm 30. If preferred, a hand grip 52 can be provided at the outer end of extension arm 50 to facilitate manipulation of lever arm 30, and can also serve as a stop means to limit the extent to which extension arm 50 can be inserted into the outer end of lever arm 30 to fix the shortest possible length of lever arm 30.

While any one of a number of differing telescoping arrangements can be utilized, a simple and preferred arrangement is to utilize tubular steel stock having square cross-sections as described above of such size that the extension arm 50 can be inserted within the lever arm 30 with a reasonably close fit. A pair of mating and opposed apertures are provided through opposed walls of lever arm 30 through which a lock means such as a lock pin or a nut and bolt 56 can be inserted. Pairs of apertures 58 are also provided through opposed wall of extension arm 50 at a number of preselected locations uniformly spaced along the length thereof, any one pair of which can be aligned with apertures in lever arm 30 to receive bolt 56 to selectively fix the position of extension arm 50 relative to the end of lever arm 30. In this way the length of extension arm 50 extending outwardly from the end of lever arm 30 can be selectively fixed to whatever the driver or operator desires merely by bolting the extension arm 50 at the desired degree of extension with bolt 56. Normally, when the inventive lever arm apparatus of this invention has been attached to the fifth wheel of any particular truck cab, and the driver or operator has adjusted the length of the lever arm 30 to that desired for that particular truck and trailer as described above, it will not normally be necessary to re-adjust the length.

FIG. 3 will illustrate a simple and inexpensive alternate embodiment where in the extension arm 50a is attachable to the end of lever arm 30a by a screw threaded interconnection, so that the length extension can be effected merely be screwing extension arm 50a into the end of lever arm 30a. In this particular embodiment both the lever arm 30a and the extension arm 50 are made of tubular steel of circular cross-section of such comparative sizes so that mating threads can be provided in each of the adjoining ends so that the threaded end of extension arm 50a can be twisted into the threaded end of lever arm 30a.

As should be apparent from the above description, the apparatus of this invention, when properly installed as shown in FIG. 5, will be rather simple to operate. Specifically, to disengage a trailer from the fifth wheel 10, the driver must merely grasp the hand grip 52 on extension arm 50 (extending from the end of lever arm 30) and pull outwardly, causing lever arm 30 to be pivoted about the first end 32, thereby causing lever arm 30 to also pull release rod 18 outwardly from fifth wheel 10, to such extent that the king pin (not shown) on trailer (not shown) is unlatched from fifth wheel 10. In addition, it should be quite apparent that if the distance between the pivot point at the first end 32 and the attachment to release rod 18 is relatively short as shown, in contrast to the distance between the attachment to release rod 18 and hand grip 52, that the arrangement will provide a lever action having a mechanical advantage as compared to a straight out pulling action pursuant to the prior art. Therefore, the manual pulling force required to operate the apparatus of this invention as described above, will be less than the manual pulling force required with the prior art technique utilizing a release tool. In the event that the length of lever arm 30 is less than that desired for most easy manipulation, the position of extension arm 50 can be adjusted by removing bolt 56 and aligning a different pair of apertures 58 with apertures in lever arm 30, and reinserting bolt 56.

In view of the simplicity of operation, as described above, it is preferable that some locking means be included to prevent either or both unintentional unlocking of the trailer, or intentional unlocking by unauthorized persons. The above cited co-pending application suggests variations of such lock means.

While two simplified and preferred embodiments of the apparatus of the present invention have been described in detail above, it should be apparent to persons having ordinary skills in mechanical arts that various other embodiments, adaptations and modifications of the invention could be made without departing from the spirit and scope of the invention. For example, the relative positions of the pivotal point at end 32 and the pulling attachment to release rod 18 could be reversed so that the pivot point is between second end 33 and the attachment to release rod 18. With such an arrangement, a pushing action at the second end 33, in contrast to a pulling action, would cause release of the king pin. Obviously too, the lever arm 30 could take a number of differing forms, as long as the lever arm 30 can be moved manually one way or the other to effect a lever action on the release rod 18, and other forms of extension arm 50 could be devised, such as for example, the extension arm 50 could be hingedly attached to the outer end of lever arm 30. In addition to these possible modifications, any of the above described locking means could be incorporated to prevent accidental and unauthorized activation of the lever arm 30. Clearly, therefore, many other modifications and embodiments could be developed and utilized without departing from the spirit of the invention.

We claim:

1. A manual release apparatus adapted for permanent attachment to a fifth wheel of a truck cab for disengaging a king pin on a truck trailer from such fifth wheel of a truck cab, such fifth wheel having an elongated release rod extending outwardly therefrom through an opening in a side wall of such fifth wheel and adapted to be pulled outwardly to disengage such king pin from such fifth wheel, the apparatus comprising; an elongated length adjustable lever arm, a first end of which is permanently and pivotally attachable to a side of such fifth wheel at a location spaced from such opening through which such release rod extends, a second end adapted to be spaced away from such fifth wheel extending generally horizontally from said first end; means for permanently attaching said lever arm to such elongated release rod such that a manual movement of said second end of said lever arm will cause said lever arm to be pivoted generally horizontally about said first end to cause such release rod to be pulled outwardly from such fifth wheel sufficient to disengage such king pin from such fifth wheel, said second end of said lever arm having an extension arm secured thereto and adapted to be selectively positioned to extend the length of said lever arm.

2. A manual release apparatus, according to claim 1, in which said second end of said lever arm is adapted to extend forwardly of any upper surfaces of any rear tires mounted on such truck cab.

3. A manual release apparatus, according to claim 1, further including a lock means adapted to selectively lock said extension arm within a non-length extending position and unlock it therefrom as necessary to permit such length extension.

4. A manual release apparatus, according to claim 1, in which said lever arm is fabricated of a tubular material and said extension arm means is telescopically attached at the second end of the lever arm, such that partially withdrawing said extension arm from the lever arm will achieve such length extension.

5. A manual release apparatus, according to claim 4, including a lock pin insertable into aligned apertures through said lever arm and said extension arm, adapted to lock said extension arm at a non-extended position unless said lock pin is withdrawn from said aligned apertures.

6. A manual release apparatus, according to claim 4, in which said extension arm is provided with a hand grip adapted to limit the extent to which said extension arm is telescopically insertable into said lever arm.

7. A manual release apparatus, according to claim 1, further including a pivot link to which said first end of said lever arm is pivotally attached and having an aperture therethrough through which said pivot link is attachable to such fifth wheel.

8. A manual release apparatus for disengaging a king pin on a truck trailer from a fifth wheel of a truck cab, such fifth wheel having an elongated release rod extending generally horizontally outwardly through an opening in a side wall of such fifth wheel adapted to be pulled outwardly to disengage such king pin from such fifth wheel, the apparatus comprising; an elongated lever arm having a pivotal link attached to a first end, said pivotal link attachable to a side of such fifth wheel at a location spaced from such opening through which such release rod extends, said pivotal link including a flange member adapted to abut against a bottom surface of said fifth wheel when said pivot link is bolted thereto, a second end of said lever arm adapted to be spaced away from such fifth wheel extending generally horizontally from said first end, said second end of said lever arm having an extension arm secured thereto adapted to selectively be positioned to extend the length of said lever arm; means for attaching said lever arm to such elongated release rod such that a manual movement of said second end of said lever arm will cause said lever arm to be pivoted generally horizontally about said first end, and cause such release rod to be pulled outwardly sufficient to disengage such king pin from such fifth wheel.

9. A manual release apparatus, according to claim 8, in which said extension arm is adapted to extend the length of said second end of said lever arm so that it will extend beyond a peripheral edge of such trailer.

10. A manual release apparatus, according to claim 9, in which said second end of said lever arm is adapted to extend forwardly of any upper surfaces of any rear tires mounted on such truck cab.

11. A manual release apparatus, according to claim 10, in which said extension arm is provided with a hand grip adapted to facilitate manual horizontal movement of said second end of said lever arm.

12. A manual release apparatus, according to claim 8, further including a lock means adapted to selectively lock said extension arm within a non-length extending position and unlock it therefrom as necessary to permit such length extension.

13. A manual release apparatus, according to claim 8, in which said lever arm is fabricated of a tubular material and said extension arm means is telescopically attached at the end thereof, such that partially withdrawing said extension arm will achieve such length extension.

14. A manual release apparatus, according to claim 13, including a lock pin insertable into aligned apertures through said lever arm and said extension arm, adapted to lock said extension arm at a non-extended position unless said lock pin is withdrawn from said aligned apertures.

15. A manual release apparatus, according to claim 13, in which said extension arm is provided with a hand grip adapted to limit the extent to which said extension arm is telescopically insertable into said lever arm.

16. A manual release apparatus, according to claim 8, in which said means for attaching said lever arm to such elongated release rod comprises a slide bar to which such elongated release rod is slidably attachable.

17. A manual release apparatus for disengaging a king pin on a truck trailer from a fifth wheel of a truck cab, such fifth wheel having an elongated release rod extending outwardly therefrom through an opening in a side wall of such fifth wheel and adapted to be pulled outwardly to disengage such king pin from such fifth wheel, the apparatus comprising: an elongated lever arm, a first end of which is pivotally attachable to a side of such fifth wheel by a pivot link at a location spaced from such opening through which such release rod extends, said pivot link having an aperture therethrough which the pivot link is attachable to such fifth wheel, and a flange member adapted to abut against a bottom surface of said fifth wheel when said pivot link is bolted to said fifth wheel to thereby minimize twisting and sagging of said lever arm, said lever arm having a second end adapted to be spaced away from such fifth wheel extending generally horizontally from said first end; means for attaching said lever arm to such elongated release rod such that a manual movement of said second end of said lever arm will cause said lever arm to be pivoted generally horizontally about said first end to cause such release rod to be pulled outwardly from such fifth wheel sufficient to disengage such king pin from such fifth wheel, said second end of said lever arm having an extension arm secured thereto and adapted to be selectively positioned to extend the length of said lever arm.

18. A manual release apparatus for disengaging a king pin on a truck trailer from a fifth wheel of a truck cab, such fifth wheel having an elongated release rod extending outwardly therefrom through an opening in a side wall of such fifth wheel and adapted to be pulled outwardly to disengage such king pin from such fifth wheel, the apparatus comprising: an elongated lever arm, a first end of which is pivotally attachable to a side of such fifth wheel at a location spaced from such opening through which such release rod extends, a second end adapted to be spaced away from such fifth wheel extending generally horizontally from said first end; a slidebar for attaching said lever arm to such elongated release rod such that a manual movement of said second end of said lever arm will cause said lever arm to be pivoted generally horizontally about said first end to cause such release rod to be pulled outwardly from such fifth wheel sufficient to disengage such king pin from such fifth wheel said second end of said lever arm having an extension arm secured thereto and adapted to be selectively positioned to extend the length of said lever arm.

* * * * *